US010034219B2

(12) United States Patent
Patini

(10) Patent No.: US 10,034,219 B2
(45) Date of Patent: *Jul. 24, 2018

(54) TARGETING COMMUNICATIONS IN A FEMTOCELL NETWORK

(71) Applicant: AT&T Mobility II LLC, Atlanta, GA (US)

(72) Inventor: Joseph Patini, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,817

(22) Filed: Aug. 17, 2017

(65) Prior Publication Data

US 2017/0347306 A1 Nov. 30, 2017

Related U.S. Application Data

(63) Continuation of application No. 15/190,322, filed on Jun. 23, 2016, now Pat. No. 9,756,546, which is a (Continued)

(51) Int. Cl.
*H04W 40/02* (2009.01)
*H04W 48/02* (2009.01)
(Continued)

(52) U.S. Cl.
CPC ......... *H04W 40/02* (2013.01); *H04W 40/248* (2013.01); *H04W 48/02* (2013.01);
(Continued)

(58) Field of Classification Search
CPC ... H04W 40/02; H04W 40/248; H04W 48/02; H04W 84/045; H04W 8/26
See application file for complete search history.

(56) References Cited

U.S. PATENT DOCUMENTS 8,089,400 B1 1/2012 Fang et al.
9,072,028 B2 6/2015 Patini
(Continued)

FOREIGN PATENT DOCUMENTS

CN 101206789 6/2008
EP 1215864 6/2002
(Continued)

OTHER PUBLICATIONS

Office Action dated Oct. 16, 2014 for U.S. Appl. No. 14/446,593, 17 pages.
(Continued)

*Primary Examiner* — Mohammad S Anwar
(74) *Attorney, Agent, or Firm* — Amin, Turocy & Watson, LLP

(57) ABSTRACT

An architecture is provided that can leverage Universal Mobile Telecommunication System (UMTS) Terrestrial Radio Access Network (UTRAN) features to facilitate more efficient or more robust communication with a femtocell network. For instance, features such as a UMTS localized common pilot channel along with various UTRAN features can enable communications to be directed to specific targets such as to a specific home nodeB (HNB) or to a specific mobile device served by the HNB, while also reducing macro network load.

20 Claims, 11 Drawing Sheets

Related U.S. Application Data continuation of application No. 14/719,959, filed on May 22, 2015, now Pat. No. 9,402,221, which is a continuation of application No. 14/446,593, filed on Jul. 30, 2014, now Pat. No. 9,072,028, which is a continuation of application No. 12/560,670, filed on Sep. 16, 2009, now Pat. No. 8,824,364.

(51) Int. Cl.
*H04W 40/24* (2009.01)
*H04W 4/12* (2009.01)
*H04W 8/26* (2009.01)
*H04W 84/04* (2009.01)

(52) U.S. Cl.
CPC ............... *H04W 4/12* (2013.01); *H04W 8/26* (2013.01); *H04W 84/045* (2013.01)

(56) References Cited

U.S. PATENT DOCUMENTS

| | | | |
|---|---|---|---|
| 9,756,546 | B2* | 9/2017 | Patini .................... H04W 40/02 |
| 2003/0011684 | A1 | 1/2003 | Narayanaswami et al. |
| 2003/0034900 | A1 | 2/2003 | Han |
| 2005/0132115 | A1 | 6/2005 | Leach |
| 2006/0036967 | A1 | 2/2006 | Crichlow |
| 2006/0195506 | A1 | 8/2006 | Li |
| 2006/0293956 | A1 | 12/2006 | Walker et al. |
| 2007/0013547 | A1 | 1/2007 | Boaz |
| 2007/0057814 | A1 | 3/2007 | Goldberg et al. |
| 2007/0130408 | A1 | 6/2007 | Leach |
| 2008/0106425 | A1 | 5/2008 | Deaver et al. |
| 2008/0207170 | A1 | 8/2008 | Khetawat et al. |
| 2009/0100492 | A1 | 4/2009 | Hicks, III et al. |
| 2009/0156213 | A1 | 6/2009 | Spinelli et al. |
| 2009/0262682 | A1 | 10/2009 | Khetawat et al. |
| 2009/0269063 | A1 | 10/2009 | Bernard et al. |
| 2009/0273462 | A1 | 11/2009 | Addy |
| 2009/0305671 | A1 | 12/2009 | Luft et al. |
| 2009/0310766 | A1 | 12/2009 | Ye |
| 2010/0013666 | A1 | 1/2010 | Panades et al. |
| 2010/0035647 | A1 | 2/2010 | Gholmieh |
| 2010/0062768 | A1 | 3/2010 | Lindqvist et al. |
| 2010/0130209 | A1 | 5/2010 | Florkey et al. |
| 2010/0144362 | A1 | 6/2010 | Bernard et al. |
| 2010/0179877 | A1 | 7/2010 | Lam |
| 2010/0184421 | A1 | 7/2010 | Lindqvist et al. |
| 2010/0278141 | A1 | 11/2010 | Choi-Grogan et al. |
| 2010/0330985 | A1 | 12/2010 | Addy |
| 2011/0110359 | A1 | 5/2011 | Cooke et al. |
| 2011/0158649 | A1 | 6/2011 | Hari |
| 2012/0044973 | A1 | 2/2012 | Johnson et al. |

FOREIGN PATENT DOCUMENTS

| | | |
|---|---|---|
| JP | 2003092776 | 3/2003 |
| JP | 2005521303 | 7/2005 |
| JP | 2009182620 | 8/2009 |
| JP | 2010520702 | 6/2010 |
| WO | 2007142443 | 12/2007 |
| WO | 2008045781 | 4/2008 |
| WO | 2008096418 | 8/2008 |
| WO | 2008108717 | 9/2008 |
| WO | 2008108716 | 12/2008 |
| WO | 2009048555 | 4/2009 |
| WO | 2009054058 | 4/2009 |

OTHER PUBLICATIONS

International Search Report and Written Opinion dated Dec. 20, 2010 for PCT Application Serial No. PCT/US2010/050449, 12 pages.
Office Action dated Nov. 16, 2011 for U.S. Appl. No. 12/560,670, 25 pages.
Final Office Action dated May 15, 2012 for U.S. Appl. No. 12/560,670, 14 pages.
Office Action dated Feb. 5, 2014 for U.S. Appl. No. 12/560,670, 32 pages.
European Office Action dated Apr. 23, 2013 for European Application Serial No. 10762822.4, 5 pages.
Office Action dated Mar. 4, 2013 for U.S. Appl. No. 12/577,856, 29 pages.
Final Office Action dated Aug. 22, 2013 for U.S. Appl. No. 12/577,856, 27 pages.
3rd Generation Partnership Project;Technical Specification Group Radio Access Network;Home (e)NodeB;Network aspects(Release 8) 3GPP Draft; R3.020_V090_Clean, 3rd Generation Partnership Project (3GPP), Mobile Competence Centre; 650, Route Des Lucioles; F-06921 Sophia-Antipolis Cedex; France, vol. RAN WG3, no. Jeju Island; Aug. 13, 2008, Sep. 3, 2008 (Sep. 3, 2008), XP050423676 p. 21-p. 23 p. 64.
"3rd Generation Partnership Project; Technical Specification Group RAN; UTRAN lu-BC Interface: Service AreaBroadcast Protocol (SABP) (Release 7) 3GPP Standard; 3 GPP TS 25.419, 3rd Generation Partnership Project (3GPP), Mobile Competence Centre; 650, Route Des Lucioles; F-06921 Sophia-Antipolis Cedex; France, No. V8.0.0, Dec. 1, 2008 (Dec. 1, 2008), pp. 1-77, XP050368415 *chapter 9.2.6* *chapter 9.2.11*."
Office Action dated Dec. 11, 2013 for U.S. Appl. No. 12/577,856, 18 pages.
International Search Report and Written Opinion dated Jan. 25, 2011 for PCT Application Serial No. PCT/US2010/047190, 18 pgs.
Japanese Office Action dated Feb. 27, 2014 for Japanese Application Serial No. 2012-529784, 13 pages.
NEC, NIT DOCOMO, "discussion of and Network Interfaces and SABP in HNB-GW." R3(09)01116, RAN Working Group 3 meeting #64, San Francisco, USA, May 4-8, 2009, 4 pages.
Ip.access Ltd., "Issues affecting SABP use for PWS with H(e)NB." 3GPP TSG RAN WG3, R3-092032, Shenzhen, P.R. china, Aug. 24-28, 2009, 3 pages.
Global System for Mobile Communications, "3rd Generation Partnership Project; Technical Specification Group Services and System Aspects; Earthquake and Tsunami Warning System Requirements and Solutions (ETWS); Solution Placeholder (Release 8)" 3GPP TR 23.828 VO.2.0 (May 2008), Valbonne—France, 2006, 24 pages.
Japanese Office Action dated Feb. 13, 2014 for Japanese Patent Application No. 2012-534211, 12 pages.
Chinese Office Action dated Apr. 1, 2014 for Chinese Patent Application No. 2008-2161CN, 9 Pages.
Final Office Action dated Apr. 15, 2014 for U.S. Appl. No. 12/577,856, 23 pages.
Office Action dated Nov. 14, 2014 for U.S. Appl. No. 12/577,856, 37 pages.
Japanese Office action dated Sep. 22, 2014 for Japanese Patent Application No. 2012-529784. 6 pages.
Chinese Office Action dated Dec. 10, 2014 for Chinese Patent Application No. 2008-2161CN. 5 Pages.
Office Action dated Jul. 29, 2015 for U.S. Appl. No. 14/119,959, 22 pages.
Final Office Action dated Feb. 23, 2015 for U.S. Appl. No. 12/577,856, 26 pages.
Japanese Office Action dated Mar. 3, 2015 for Japanese Patent Application No. 2012-534211, 11 pages.
Japanese Office action dated Apr. 14, 2015 for Japanese Patent Application No. 2012-529784,16 pages.
Chinese Office Action dated Jun. 25, 2015 for Chinese Patent Application No. 201080046120.5, 8 Pages.
Office Action dated Jun. 30, 2015 for U.S. Appl. No. 12/577,856, 28 pages.
Notice of Allowance dated Oct. 28, 2015 for U.S. Appl. No. 12/577,856, 30 pages.
Final Office Action dated Nov. 19, 2015 for U.S. Appl. No. 14/119,959, 21 pages.
Korean Office Action for Application No. 10-2012-7008944, dated Mar. 22, 2016, 5 pgs.
Japanese Office Action dated Aug. 10, 2015 for Japanese Application No. 2014-173032, 4 pgs.

(56) References Cited

OTHER PUBLICATIONS

European Office Action dated Mar. 7, 2016 for European Application Serial No. 10762822.4, 4 pages.
Chinese Office Action dated Jun. 1, 2016 for Chinese Application Serial No. 201080046120.5, 11 pages.
Japanese Office Action dated May 31, 2016 for Japanese Application Serial No. 2012-529784, 4 pgs. (with English translation).
Non-Final Office Action for U.S. Appl. No. 15/007,535, dated Mar. 23, 2016, 25 pgs.
Final Office Action for U.S. Appl. No. 15/007,535, dated Jul. 25, 2016, 26 pgs.
Office Action for U.S. Appl. No. 15/007,535, dated Dec. 5, 2016, 21 pgs.
Office Action for U.S. Appl. No. 15/190,322, dated Mar. 2, 2017, 30 pgs.
Office Action for U.S. Appl. No. 15/007,535, dated May 8, 2017, 22 pgs.
Notice of Allowance for U.S. Appl. No. 15/007,535, dated Sep. 6, 2017, 20 pgs.
European Office Action dated Dec. 11, 2017 for European Application Serial No. 10752674.1, 6 pages.

\* cited by examiner

TARGETING COMMUNICATIONS IN A FEMTOCELL NETWORK

CROSS-REFERENCE TO RELATED APPLICATIONS

This application is a continuation of, and claims priority to each of, U.S. patent application Ser. No. 15/190,322, filed Jun. 23, 2016, now issued as U.S. Pat. No. 9,756,546), and entitled "TARGETING COMMUNICATIONS IN A FEMTOCELL NETWORK", which is a continuation of U.S. patent application Ser. No. 14/719,959, filed May 22, 2015, now issued as U.S. Pat. No. 9,402,221, and entitled "TARGETING COMMUNICATIONS IN A FEMTOCELL NETWORK", which is a continuation of U.S. patent application Ser. No. 14/446,593, filed Jul. 30, 2014, now issued as U.S. Pat. No. 9,072,028, and entitled "TARGETING COMMUNICATIONS IN A FEMTOCELL NETWORK", which is a continuation of U.S. patent application Ser. No. 12/560,670, filed Sep. 16, 2009, now issued as U.S. Pat. No. 8,824,364, and entitled "TARGETING COMMUNICATIONS IN A FEMTOCELL NETWORK", and the entireties of the aforementioned applications are hereby incorporated by reference herein.

TECHNICAL FIELD

The present application relates generally to a Universal Mobile Telecommunications System (UMTS) Terrestrial Radio Access Network (UTRAN), and more specifically to directing communications to specific recipients within a UTRAN network while reducing macro network resource utilization.

BACKGROUND

Conventional macro network platforms that provide service to mobile devices (e.g., user equipment (UE)) must contend with the mobility of the UE when providing communication services. Traditionally, messages intended for a particular UE must be broadcast to a wide area, whereby surrounding nodes of the macro network all broadcast duplicate information to ensure the intended recipient, wherever the UE is located at a given time, receives the communication. In terms of resource utilization, such flood broadcasting is very inefficient, yet often a consequence when the recipient UE potentially expects to maintain a high degree of mobility over a wide area.

In contrast to macro networks, femtocell network platforms rely upon various nodes or femtocells (e.g., home nodeBs (HNBs)). HNBs are building-based wireless access points interfaced with a wired broadband network. HNBs are generally deployed to improve indoor wireless coverage and to offload a mobility radio access network (RAN) operated by a wireless network and service provider. Thus, coverage of a HNB device is generally intended to be approximately confined within the bounds of an indoor compound such as a residential or commercial building.

Unfortunately, communication systems today—those that offer to subscribers both macro network services for coverage over a wide area and femtocell network for indoor home or office use—generally treat the femtocell network as a sub-network of the macro network and thus handle communications in a substantially identical manner. Such treatment is unfortunate because HNBs, unlike mobile phones or other UE, typically do not change location, but rather remain at a particular, known location.

DETAILED DESCRIPTION

Figure 1:
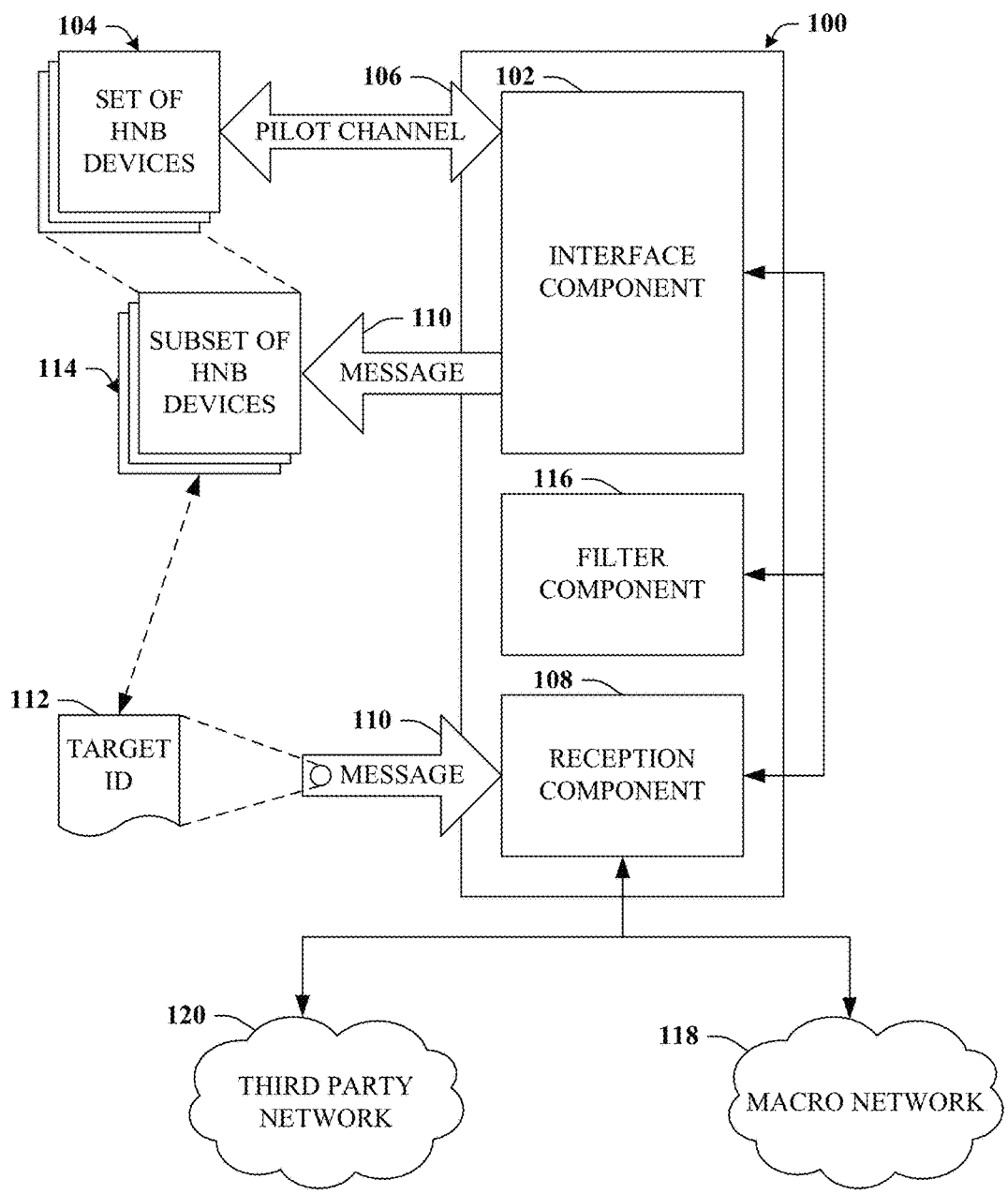
FIG. 1 is a block diagram of a system that can leverage Universal Mobile Telecommunication System (UMTS) Terrestrial Radio Network (UTRAN) features to facilitate more efficient or robust communication with a femtocell network.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "platform," "component," "service," "framework," "interface," "driver," "tier," "layer," "node" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "femtocell," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

In addition, the terms "wireless network" and "network" are used interchangeable in the subject application, when context wherein the term is utilized warrants distinction for clarity purposes such distinction is made explicit.

The subject matter disclosed herein, in one aspect thereof, comprises an architecture that can leverage Universal Mobile Telecommunication System (UMTS) Terrestrial Radio Access Network (UTRAN) features in order to facilitate more efficient or more robust communication for a femtocell network. In particular, the architecture can leverage the fact that home nodeB (HNB) devices within a femtocell network remain relatively stationary and that today's HNB devices often provide availability of a UMTS localized common pilot channel, which can operate as a dedicated channel for communications. Various other UTRAN features can also be leveraged to provide a number of benefits over conventional femtocell communications.

In accordance therewith and to other related ends, the architecture can be configured to interface to a set of HNB devices that employ an UMTS localized common pilot channel. This set of HNB device can represent all or a portion of a UTRAN network. The architecture can also be configured to receive a message originating from, or forwarded by, a messaging center or another suitable element of the host communication network. The message can include a target ID that identifies a subset of HNB devices included in the set of HNB devices. Essentially, this subset of HNB devices can constitute one or more of the HNB devices included in the set and, moreover, are specifically identified as intended recipient(s) of the message, as indicated by the target ID.

Accordingly, the architecture can thus facilitate transmission of all or a portion of the message to only the subset of HNB devices identified by the target ID. In other words, messages need not be duplicated and transmitted by surrounding nodeBs, either at the macro network level or the femtocell network level. Rather, messages can be specifically targeted only to and delivered only to a single HNB device or a collection of HNB devices based upon a logical assignment that accounts for substantially any criteria desired. Such targeted messaging can be employed in connection with home/office utility management or substantially any other suitable purpose.

Referring now to the drawing, with reference initially to FIG. 1, system 100 that can leverage Universal Mobile Telecommunication System (UMTS) Terrestrial Radio Network (UTRAN) features to facilitate more efficient or robust communication employing a femtocell network is depicted. Generally, system 100 can be implemented in or coupled to a femtocell network and/or an operating support system (OSS) for a femtocell network. Regardless, system 100 can include interface component 102. Interface component 102 can be configured to interface to set 104 of home nodeB (HNB) devices that employ UMTS localized common pilot channel 106. In one or more aspects, set 104 can include all or a portion of HNB devices operating within a UTRAN network.

Appreciably, UMTS localized common pilot channel 106 can operate as a dedicated signal for an associated HNB that can facilitate numerous advantages in wireless communication systems. For example, HNB devices (e.g., femtocells) can provide or enhance indoor network coverage, and thus, typically, remain at a static location such as at a network subscriber's home or office. Thus, even though user equipment (UE) such as mobile phones or handsets might otherwise constantly change location, while such UE is being served by a particular HNB, the location of that UE is established and the dedicated signal provided by pilot channel 106 can be leveraged to facilitate more efficient communication, which is further detailed herein.

In accordance therewith, system 100 can also include reception component 108 that can receive message 110. Message 110 can originate from or be forwarded by a messaging center (not shown) associated with the wireless network. Regardless, message 110 can include target ID 112, wherein target ID 112 can identify subset 114 of HNB devices included in set 104 of HNB devices. In other words, from among all HNB devices included in set 104, a certain subset (e.g., subset 114) of one or more HNB devices can be identified by target ID 112. In addition, system 100 can further include filter component 116 that can facilitate transmission of message 110 to only subset 114 of HNB devices identified by target ID 112. For example, once HNB devices that are not identified by target ID 112 have been filtered from a target list, filter component 116 can, for example, employ interface component 102 to transmit message 110 (or suitable contents or portions) to and only to the HNB devices included in subset 114.

Thus, specific groups or even individual network subscribers can be expressly targeted by network traffic, which can be more efficient since flood broadcasting is not necessary to reach any particular subscriber. In particular, communications (e.g., message 110) can be delivered to specified HNB devices (e.g., subset 114) without any extra or undue load upon other network resources such as that customarily required by conventional systems. For example, flood broadcasting can be avoided for an associated UTRAN network. Similarly, RAN resources of an associated macro network (e.g., macro network 118) such as nodeB's or Radio Network Controllers (RNCs) need not be unnecessarily utilized. The above applies regardless of whether message 110 originates inter-system such as an associated messaging center (e.g., short message service (SMS)) or originates from a disparate source such as third party network 120 and is then forwarded to the host network for delivery to the intended recipient(s).

Accordingly, a greater degree of granularity can be attained than has previously been available on macrocell UMTS networks or associated femtocell networks. Moreover, in addition to savings in terms of resource utilization and providing more robust granularity, the above-mentioned techniques can also be inherently more secure. For instance, since delivery of message 110 (or other communications) will generally be limited to intended or authorized recipients, there is typically little or no exposure of message 110 of any type to unintended recipients.

A further benefit of the features described herein is that inter-system registration oscillations can be avoided. For example, one problem in conventional femtocell networks is that a mobile UE served by a particular HNB device, say at the subscriber's home or office, will often attempt to reselect to the macro network that provides wide area coverage even while substantially within the coverage area of the HNB. These attempted reselections can "ping-pong" back and forth between the femtocell network and the macro network. Moreover, during such registration oscillations while the UE is attempting to register with one or the other network, the UE is generally unable to receive communications for which it is an intended recipient. However, by utilizing a designated resource at a known location, there is no need to attempt to select out of the femtocell network and/or look to the macro network. Thus, registration oscillation can be substantially mitigated.

In addition, it should be appreciated that many or all of the benefits described herein can be achieved without the necessity of additional hardware or other costly means. Rather, the features and/or solutions detailed herein can be implemented on existing communication platforms without significant modifications.

Figure 2:
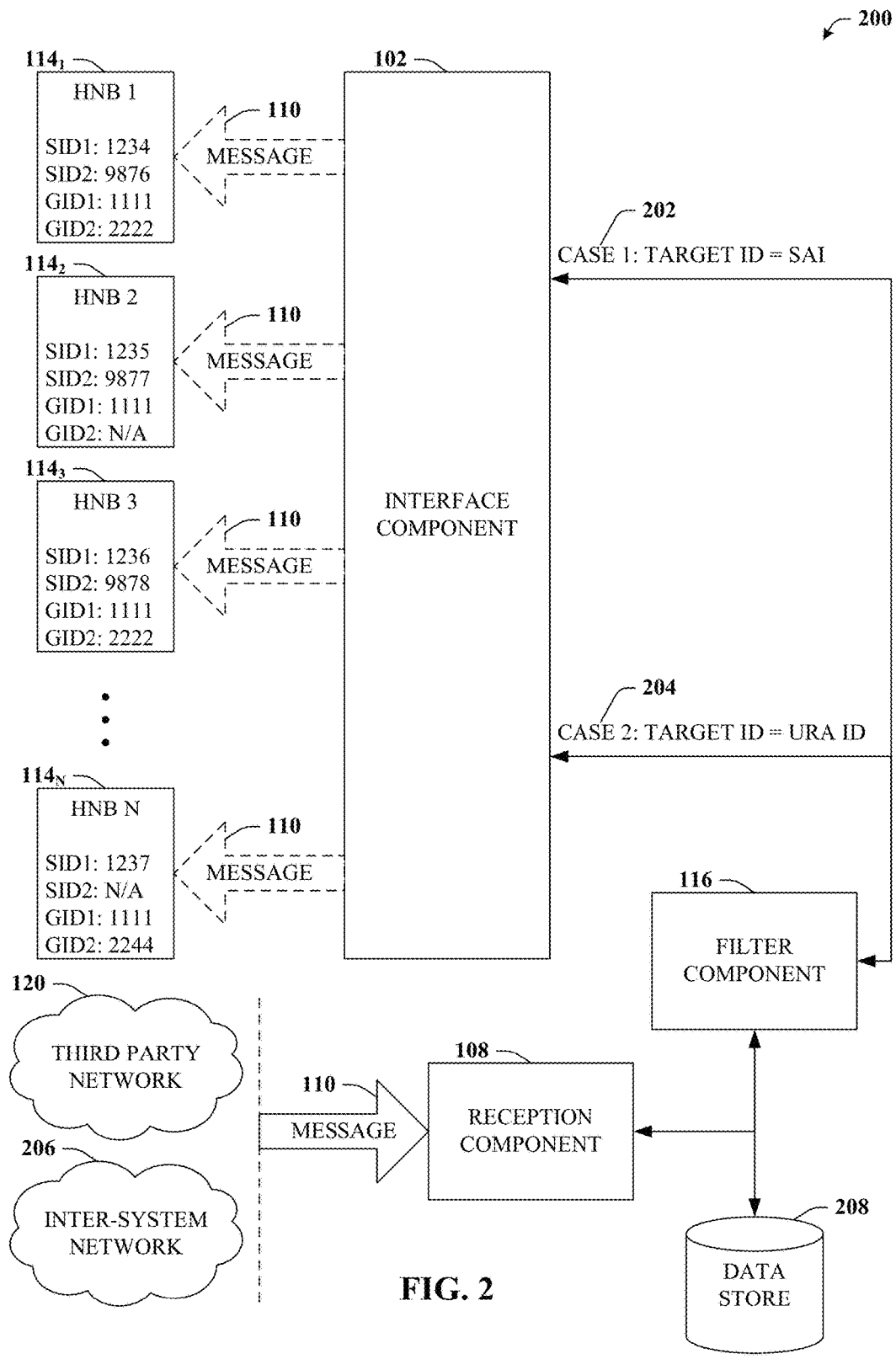
FIG. 2 illustrates a block diagram of a system that illustrates additional features, aspects, or detail in connection with communication with a femtocell network.

Turning now to FIG. 2, system 200 illustrates additional features, aspects, or detail in connection with communication employing a femtocell network. System 200 can include interface component 102 that can be configured to interface to set 104 of HNB devices as substantially described supra. Depicted here, however, are HNB devices $114_1$-$114_N$, which are intended to be only those HNB devices included in subset 114 rather than the entire set 104. In other words, only the HNB devices referred to by target ID 112. Thus, while four distinct HNB devices are illustrated in the diagram, it should be appreciated that N can be substantially any positive integer. Hence, subset 114 can be comprised of a single HNB device or multiple HNB devices.

As with system 100 of FIG. 1, system 200 can also include reception component 108 that can receive message 110 that includes target ID 112, wherein target ID identifies the specific (one or more) HNB device(s) to which message 110 is intended to be directed. Message 110 can originate from third party network 120 such as, e.g., a utility company or service provider; or from inter-system network 206 such as a message center for the host communication platform providing or maintaining the femtocell network and/or macro cell network 118.

In addition, system 200 can further include filter component 116 as substantially described above. In particular, filter component 116 can identify the intended recipient(s) of message 110 based upon target ID 112, and employ interface component 102 to propagate message 110 only to those intended recipient(s).

In one or more aspects of the disclosed subject matter, target ID 112 can be a UTRAN Service Area Identifier (SAI), which is illustrated as "Case 1" and denoted by reference numeral 202. SAI is defined in the 3GPP technical specifications, which provides unified telecommunications standards. The June 2009 3GPP technical specification can be found at http colon slash slash www dot 3gpp dot org slash specifications, and is included herein by reference. Briefly, a SAI represents a value or a localized cell ID for an individual HNB or site. Thus, in connection with the disclosed subject matter, the SAI can represent an identifier associated with a single HNB device. In that case, filter component 116 can facilitate transmission (e.g., via interface component 102) of message 110 only to the single HNB device. Naturally, in this case, subset 114 of HNB devices identified by target ID 112 is a single HNB device.

Appreciably, assignment of a SAI can be handled within a UTRAN system, which is further detailed in connection with FIGS. 3A and 3B. Thus, it should be understood that each and every HNB device included in set 104 can be assigned one or more unique identifier(s). Hence, each HNB device included in subset 114 (e.g., a subset of set 104) will be assigned one or more unique identifier that identifies the associated single HNB device, which is illustrated as single identifier 1 (SID1), single identifier 2 (SID2), and so on for HNB devices $114_1$-$114_N$, wherein each of the HNB devices $114_1$-$114_3$ have multiple SIDs (in this case SID1 and SID2 yet more can exist), while HNB device $114_N$ has only one SID (in this case SID1).

Therefore, for example, if target ID 112 represents an SAI equal to "1234" or "9876", then filter component 116 can ensure that interface component 102 transmits message 110 only to HNB device $114_1$. Likewise, if target ID 112 represents an SAI equal to the values "1235" or "9877", message 110 can be delivered only to HNB device $114_2$, and so on. It should be appreciated that four digit base-ten numbers such as "1234" are selected for illustrative purposes only and that actual SAI values can be implemented in substantially any format desired and/or in conformity with the 3GPP standards.

Moreover, given that the UTRAN system can handle assignment of SAIs, such identifiers can be logically assigned according to any scheme desired. Thus, a SAI can be designated as a group identifier even though the 3GPP specification does not necessarily envision such use. Accordingly, one or more unique group identifiers are illustrated by HNB devices $114_1$-$114_N$ as GID1, GID2 (and additional GIDs can also exist) according to substantially any logical grouping assignment desired. For instance, a single SAI, say, GID "1111" can identify a block or range of other single SAIs, say those SIDs from "1234" to "1237". As another example, the SAI that represents a GID can denote all or a portion of HNB devices within a particular zip code. As still another example, the SAI that represents a GID can represent subscribers to third party products or services, such as street addresses with a particular garbage collection service, utilities provider, lawn care service, club member for a local business or vendor, a public or private community, a particular zoning area, or the like as well as for substantially any localized weather, news, or advertisements. In addition, the disclosed features can be readily integrated with or supplement future developments such as regulation or controls relating to, as well as actual deployment of, "Smart Grid."

Put in another perspective, a SAI that represents a unique group identifier (e.g., GID=1111) can be assigned to all residences that share a particular garbage collection service, while a second SAI (e.g., GID=2222) can be assigned to subscribers to a particular gas utility company, and yet a third SAI (e.g., GID=2244) represents community members of a neighborhood watch program. Thus, billing notifications or other information from the garbage collection service can be included in message 110 along with target ID 112 of "1111" such that only the targeted parties will receive message 110, in this case at least HNB devices $114_1$, $114_2$, $114_3$, and $114_N$. Similarly, notifications or information from the gas utility company included in message 110 with a target ID 112 of "2222" can be delivered only to HNB devices $114_1$ and $114_3$, and so on for other target ID(s) 112.

In one or more aspects of the disclosed subject matter, target ID 112 can be a UTRAN Routing Area (URA) ID, which is illustrated as "Case 2" and denoted by reference numeral 204. A URA ID is typically associated with multiple HNB devices included in a specified logical routing area. Thus, in contrast to SAI's, which are typically associated with a single HNB device, URA IDs customarily inherently define a collection of HNB devices such as those within a logical routing area. Hence, in this case, a URA ID can be similar to SAIs that represent group identifiers (e.g., GIDs), and can therefore be implemented with all or some of the features described supra in connection with GIDs.

Furthermore, in one or more aspects, target ID 112 can be a URA ID associated with a single HNB device in which a URA paging channel is enabled. Thus, while typical URA IDs relate to collections or groups of HNB devices, when the URA paging channel is enabled, an individualized URA ID can be assigned to a single HNB device. Therefore, all or some of the features detailed above with respect to SAIs can be implemented in this case as well. Employing URA IDs can be especially convenient when message 110 originates at (or is forwarded by) an inter-system source such as an SMS messaging center, in which case message 110 can be an SMS message. Moreover, whether utilizing SAIs or URA IDs or both, such identifiers can be stored to data store 208 for later access or recall and/or comparison with target ID 112 included in message 110. Data store 208 can also include other unique identifiers associated with HNB device hardware such as a serial number, a Media Access Control (MAC) address, or the like, any of which can be associated with one or more SAI or URA ID in data store 208.

Figure 3A:
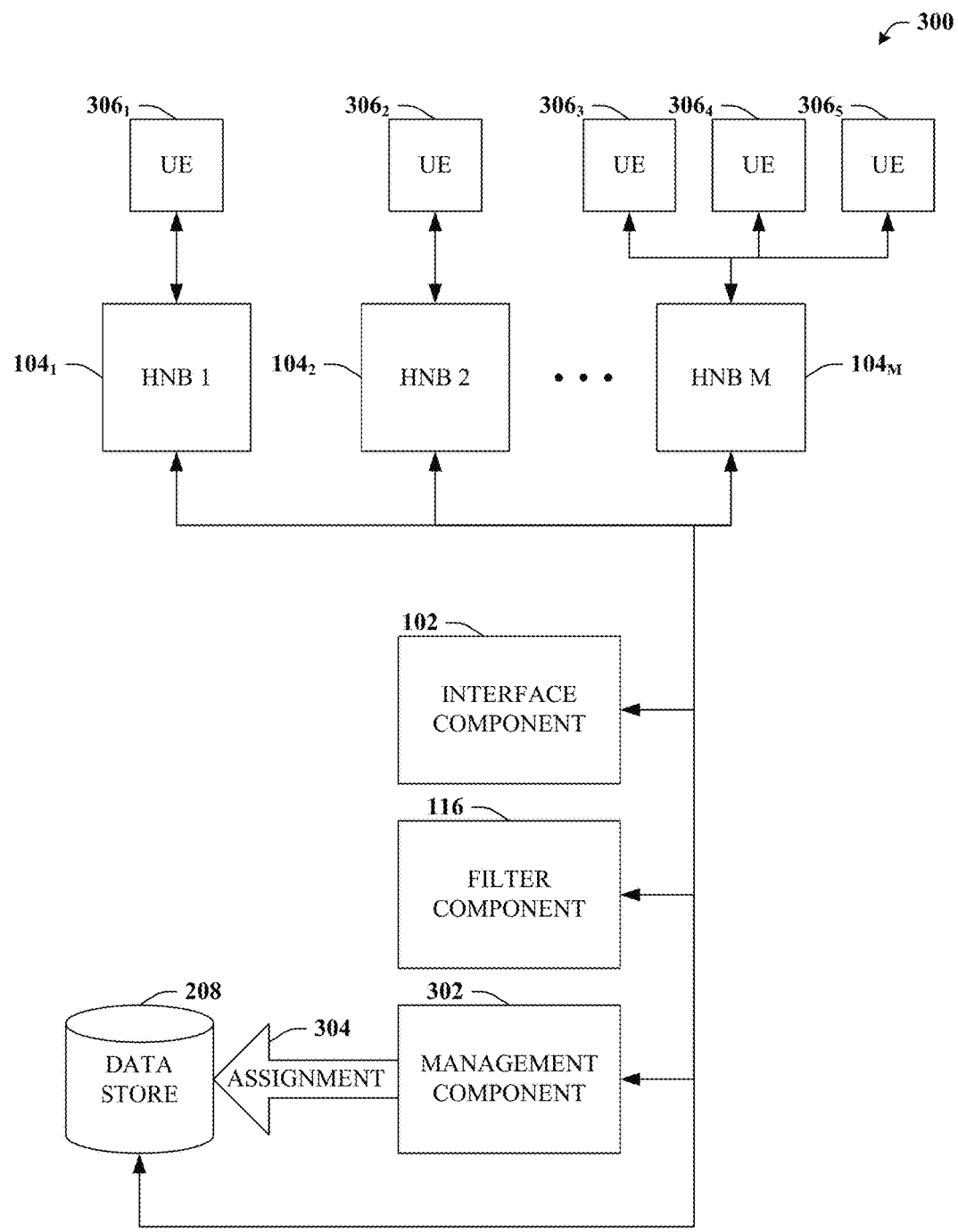
FIG. 3A depicts a block diagram of a system that can allocate an SAI or an URA ID as a target ID.

Referring now to FIG. 3A, system 300 that can allocate a SAI or an URA ID is illustrated. In more detail, system 300 can include interface component 102 and filter component 116 as substantially described supra, as well as other components described herein. In addition, system 300 can also include management component 302 that can assign (e.g., allocate or update) one or more target ID (e.g., a SAI or an URA ID) to each HNB device included in set 104, and depicted here as HNB devices $104_1$-$104_M$, wherein M is a positive integer, generally greater than N as described in connection with FIG. 2.

Thus, regardless of whether target ID 112 represents a SAI or an URA ID, message 110 can be specifically targeted and delivered to only the intended recipient(s). Moreover, by allowing single or individual HNB devices to be targeted as well as any number of groups or collections of HNB devices, a rich and efficient means for delivering message 110 only to specified parties can be achieved. For example, individual households (or even individual mobile devices, discussed infra) can be targeted as well as various communities that pivot on essentially any desired characteristic or association. For example, management component 302 can provide assignment 304 to data store 208 that allocates one or more SAI or URA ID (e.g., target ID 112) to any given HNB device included in set 104 and can do so based upon any trait a network operator desires, which is further discussed with reference to FIG. 3B.

Figure 3B:
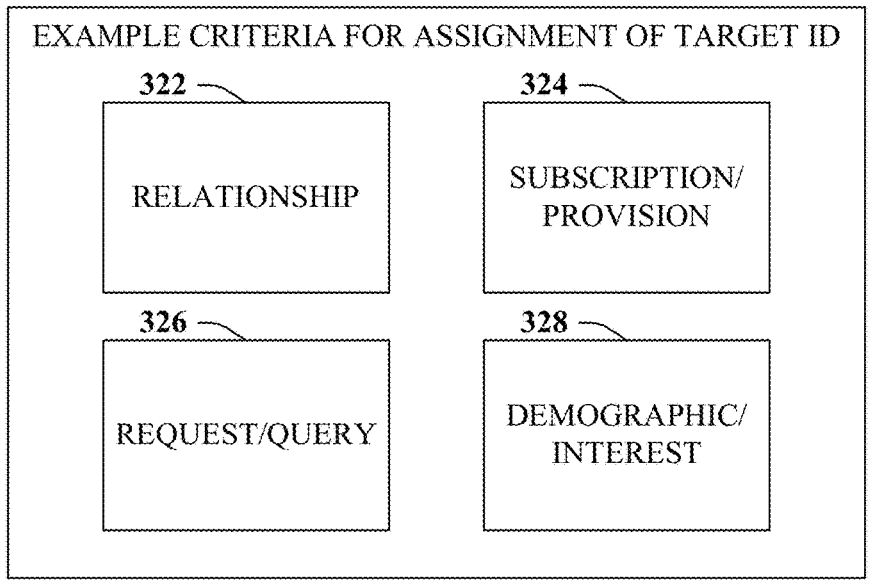
FIG. 3B is a block diagram that illustrates example criteria for assignment of target IDs.

While still referring to FIG. 3A, but turning also to FIG. 3B, illustration 320 provides example criteria for assignment of target IDs is depicted. In particular, illustration 320 provides example criteria that can be useful or convenient for management component 302 when assigning target IDs to specific HNB devices. Such criteria can be based upon, e.g., a customer, commercial, public, private, or another type of relationship (denoted relationship 322) or a subscription or good or service provision (denoted by reference numeral 324). Typically, relationship 322 and subscription/provision 324 will generally relate to examples provided previously such as waste removal services or utilities provision, but can also be based upon warranty features of goods or services, familial relationships, friends, acquaintances, or colleague relationships, club or membership relationships, location-based relationships and so forth.

In addition, management component 302 can produce assignment 304 based upon request or query 326. For example, consider an ad hoc community based upon a television audience who employ an UE to respond to a poll or voting request advertised by the televised program. Management component 302 can allocate a target ID 112 for such an ad hoc community and associate that target ID 112 to the appropriate subset 114 of HNB devices. Thus, results of the poll or vote or other data can be later delivered only to those HNB devices from which a vote or poll response originated or for which that particular target ID 112 is otherwise applicable (e.g., the subset 114 of HNB devices from which votes were sent).

Furthermore, management component 302 can also allocate assignment 304 based upon a demographic or interest 328 for the residence or business hosting one or more HNB devices. Demographic/interest 328 can be, e.g., based upon age, gender, income, political views, likes, dislikes and so forth, and can be particularly relevant for advertisements included in message 110. Thus, management component 302 can design a particular community based upon a certain demographic/interest 328 and provision a SAI or URA ID for that community. Hence, any message 110 deemed suitable can be targeted expressly to that community based upon the particular demographic/interest 328. It should be appreciated that regardless of the particular criteria employed, whether one of the provided examples indicated by illustration 320 or other criteria, all suitable information can be stored to data store 208. For example, management component 302 can build profiles for each HNB device that can relate to relationships 322, subscriptions/provisions 324, requests/queries 326, and/or demographic/interests 328 of a user of that particular HNB device.

It should be further appreciated that, while many HNB devices might well each serve a single UE (e.g., a preferred mobile device utilized by a single individual) as illustrated by HNB $104_1$ and HNB $104_2$ respectively serving UE $306_1$ and UE $306_2$, it is also conceivable that a single HNB device can serve many UE terminals. For example, as depicted here in the case of HNB device $104_M$ serving multiple UE, specifically UE $306_3$-$306_5$, any or all of which can be utilized by a different individual, such as multiple individuals in the same household or multiple employees at the same place of business.

In the latter case, where an HNB device serves multiple UE terminals, it should be appreciated that target ID 112 typically only identifies a particular HNB device and therefore generally cannot distinguish between individual recipients in this latter case. However, an additional feature exists in which individual subscribers served by an HNB device can be specifically targeted. For example, HNB devices often maintain an access control list or a "whitelist" that identifies the UE devices authorized to access the HNB device. Typically, access control lists are populated by way of customer input (e.g., inputting authorized phone numbers or other identification), however any suitable discovery mechanism can be employed to automatically populate an access control list.

Regardless, once such information is obtained, it can be propagated by the HNB up the femtocell network to management component 302 (e.g., to the OSS or to another network component where management component 302 resides). As with other data described herein, the access control list can be stored to data store 208. Moreover, once such information is obtained, communications can have the granularity to target individual subscribers above and beyond targeting individual HNB devices. More specifically, message 110 can further include a UE ID (e.g., recorded in an access control list) that identifies a specific wireless communication device served by a particular HNB device included in subset 114 of HNB devices. Thus, filter component 116 can determine a specific individual to whom message 110 is directed and employ interface component 102 to deliver message 110 only to a specific UE utilized by or otherwise associated with that specific individual.

Figure 4:
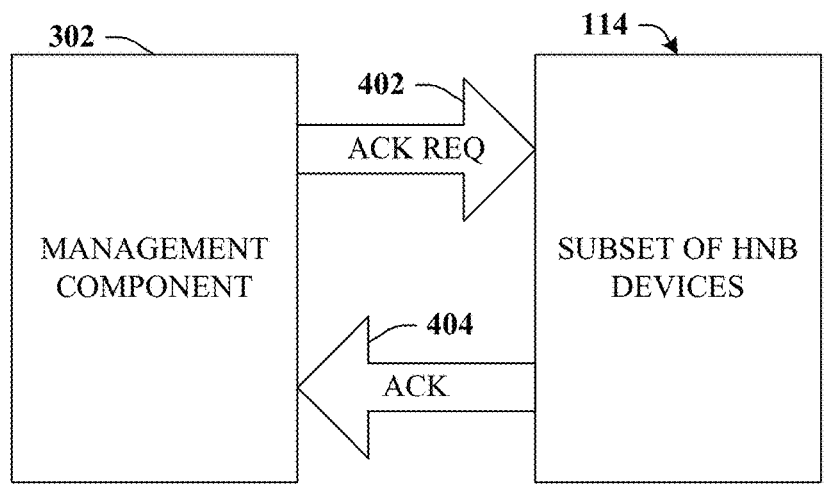
FIG. 4 illustrates a block diagram of a system that can employ acknowledgement requests for further mitigating registration oscillations and/or reducing inter-system messaging.

With reference now to FIG. 4, system 400 that can employ acknowledgement requests for further mitigating registration oscillations and/or reducing inter-system messaging is provided. As introduced above, when a UE is registered to an associated HNB device, a dedicated resource such as a URA or a SAI range can eliminate or reduce unnecessary resource loading/communications to the macro network since a connection is already known and established with the femtocell network. As long as that connection exists, there is no need to broadcast communications on the macro network, since the location of (and therefore the path to) the designated target is already known. Thus, registration oscillation can be mitigated by targeting communications to the femtocell network while the UE is utilizing the femtocell network (e.g., an associated HNB device).

Moreover, registration oscillation can be further mitigated by facilitating acknowledgements in connection with certain communications. For example, in conventional networks and/or at the macro network level, messages delivered by way of flood broadcasting are not typically acknowledged. Thus, most systems employ a retry mechanism to transmit the broadcasts a certain number of times (e.g., three retries) before timing out. With respect to the features described herein much of this activity can be viewed as an unnecessary utilization of resources.

For example, once a message (e.g., message 110) has been transmitted to the intended recipient(s) (e.g., subset 114), management component 302 can facilitate transmission of acknowledgement request 402 to subset 114 of HNB devices to acknowledge that message 110 has been received. If or when acknowledgement 404 is received by management component 302, it can be determined that retries are unnecessary and further that a dedicated resource is established for further communications directly to the associated HNB device. Moreover, in one or more aspects of the disclosed subject matter, acknowledgement request 402 can relate to a cyclic acknowledgement that mitigates inter-system reselection between a femtocell network and an associated macro network.

Appreciably, by employing cyclic acknowledgements, e.g., propagated from a UE to the associated HNB device and then up to management component 302, the location of the UE can be re-verified over time. Thus, in addition to extending the period in which registration oscillation can be mitigated, implementing a cyclic acknowledgement on a dedicated HNB-UE basis as described can also contribute to reducing inter-system messaging such as that for paging traffic. For instance, as long as acknowledgement requests 402 are met with acknowledgement 404, there is no need to listen for a particular UE on the macro network since a dedicated stream to the associated HNB device is already operating. Hence, conventional signaling between the two networks, namely the femtocell network and the macro network, can be reduced or eliminated entirely. Furthermore, it should be understood that although management component 302 is conceptually depicted transmitting acknowledgement request 402 to and receiving acknowledgement 404 from subset 114 of HNB devices, interface component 102 can be employed to perform the actual transmitting and receiving on behalf of management component 302.

Figure 5:
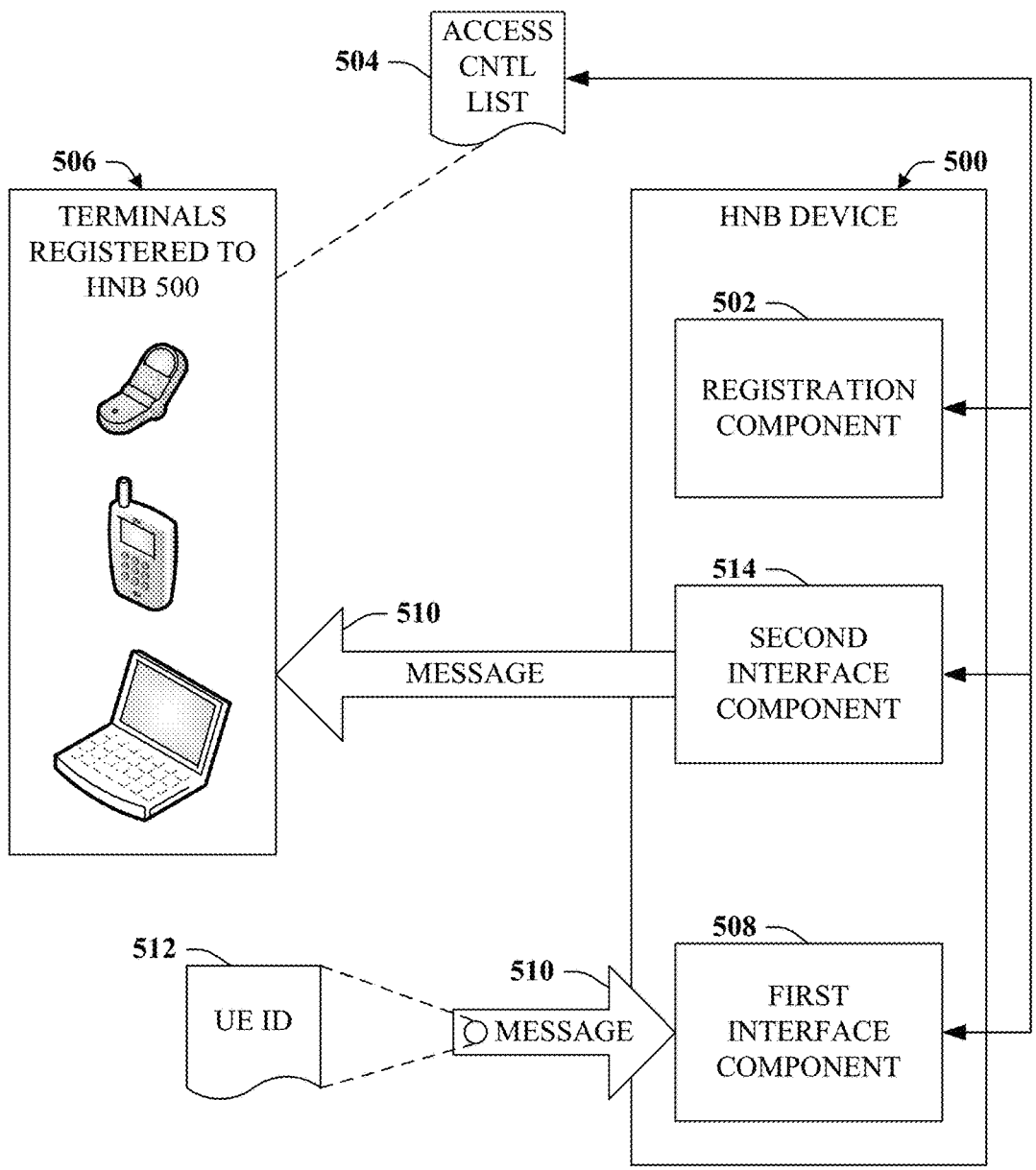
FIG. 5 is a block diagram of a system that includes a HNB device that can facilitate more efficient or robust communication.

Now turning to FIG. 5, system 500, which represents a HNB device that can facilitate more efficient or robust communication, is illustrated. In general, HNB device 500 can include registration component 502 that can maintain access control list 504, sometimes referred to as a "whitelist." Access control list 504 can include multiple UE IDs, wherein each of the multiple UE IDs can represent one or more specific wireless communication device(s) authorized to be served by HNB device 500. As one example, HNB device 500 can operate in a household with three distinct subscribers to the host communications network. Examples of wireless communication devices or terminals 506 can include cellular phones, smart phones, mobile terminals, or the like.

HNB device 500 include an interface to a remote network (e.g., first interface component 508) as well as an interface (e.g., second interface component 514) to the hosted UE devices or terminals 506 registered to HNB device 500, in this case 3 terminals 506 are depicted, but it should be appreciated that substantially any number of terminals 506 can be served. First interface component 508 can receive message 510 that can include UE ID 512. Message 512 can be substantially similar to or a portion of message 110 discussed supra, which can include target ID 112. While target ID 112 can identify intended recipients defined as subset 114, of which HNB device 500 is a member, UE ID 512 can identify a specific wireless communication device from among multiple registered wireless communication devices or terminals 506 served by HNB device 500.

In addition, second interface component 514 that is included in HNB device 500 can transmit message 510 only to the specific wireless communication device(s) identified by UE ID 512 included in message 510. Thus, even though 3 terminals 506 are served by HNB device 500, message 510 can be selectively transmitted to any one or more of these 3 terminals based upon the UE ID 512.

Figure 6:
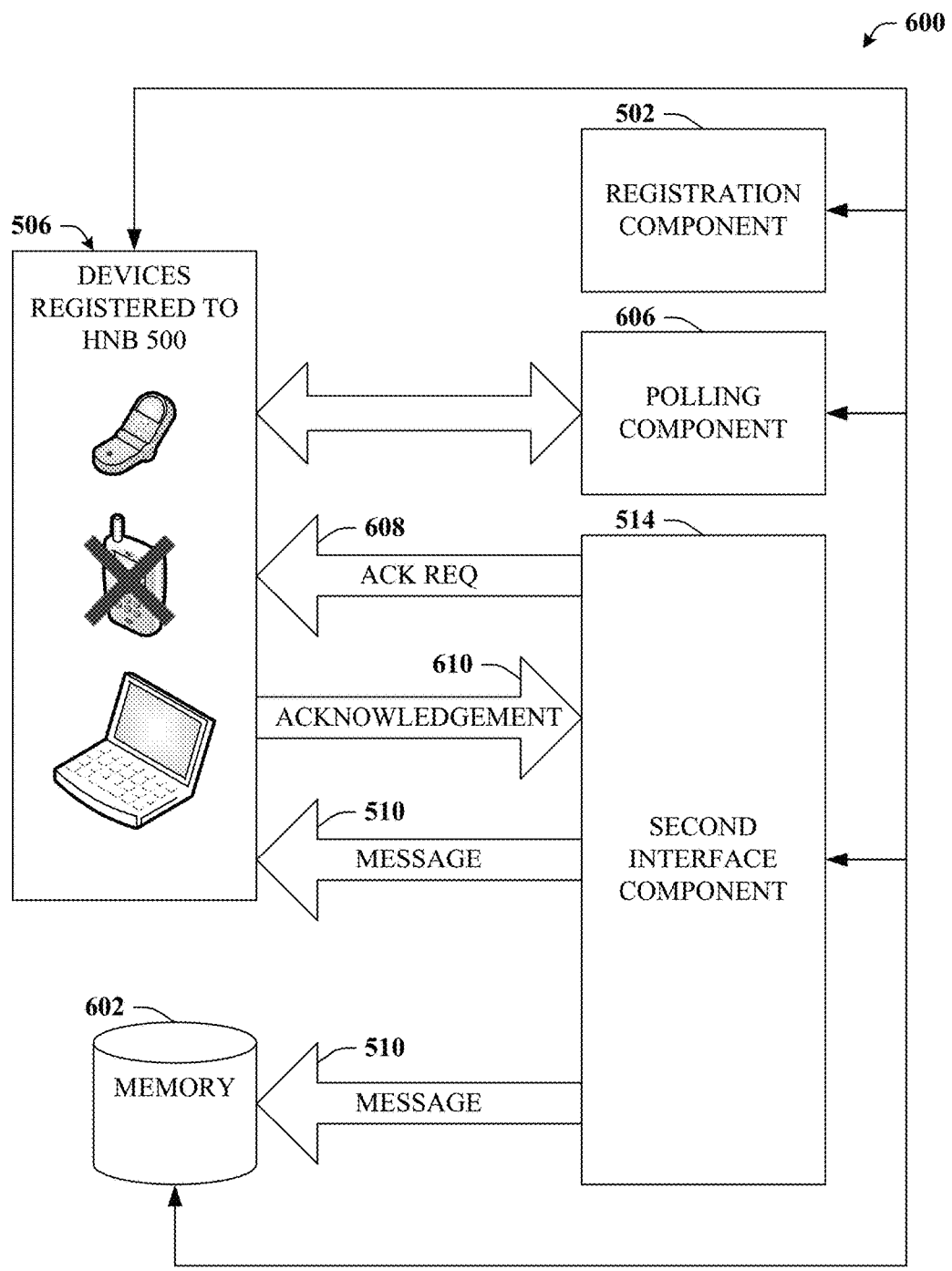
FIG. 6 illustrates a block diagram of a system that provides for additional features or aspects in connection with an HNB device that can facilitate more efficient or robust communication

Referring now to FIG. 6, system 600 that provides for additional features or aspects in connection with an HNB device that can facilitate more efficient or robust communication is illustrated. System 600 can include registration component 502 that can maintain access control list 504 and second interface component 514 that can transmit message 510 to only specified terminals 506 identified by UE ID as substantially detailed supra, as well as other components detailed in connection with HNB device 500 of FIG. 5.

Additionally, system 600 can further include memory 602 that can store message 510 when the specific wireless communication device or terminal 506 identified by UE ID 512 is not present (or camped on its home femtocell). Furthermore, system 600 can also include polling component 606 that can detect the presence of the specific wireless communications device (e.g., any or all terminals identified by access control list 504). In accordance with the above, when one or more wireless communication terminals identified by UE ID 512 is not present (in this case, the middle terminal 506 with an "X" to denote a lack of current presence on HNB device 500), second interface component 514 can store message 510 intended for the absent terminal 506 to memory 602.

It should be appreciated that polling component 606 can actively or persistently maintain a presence or absence list, which can be readily compared to UE ID(s) 512 when message 510 is received in order to ascertain whether message 510 can be forwarded directly to the specific wireless communication terminal(s) 506 or stored to memory 602. Moreover, if message 510 is received when a terminal 506 identified by UE ID 512 is absent, polling component 606 can facilitate transmission (e.g., by way of second interface component 514) of messaged 510 previously stored to memory 602 once it is detected that the specific terminal is no longer absent.

Furthermore, system 600 can also receive an acknowledgement request 608, which can be received by first interface component 508 and can be substantially similar to acknowledgement request 402 discussed in connection with FIG. 4. Upon receipt, polling component 606 can forward the acknowledgement request 608 to the one or more recipient(s) among terminals 506 of message 510. In response, terminals 506 who received acknowledgement request 608 can reply with acknowledgement 610, which can be received by second interface component 514 and forward along the uplink by first interface component 508 of HNB device 500. Acknowledgement 610 can verify that message 510 was received by a specific terminal 506 identified by UE ID 512, and thus mitigate registration oscillation and reduce inter-system messaging by establishing a dedicated path between a particular UE and other communication sources. Moreover, as introduced previously, both acknowledgement request 608 and acknowledgement 610 can be of a periodic or cyclic nature, thus potentially refining the duration of this dedicated path more suitably.

Figure 7:
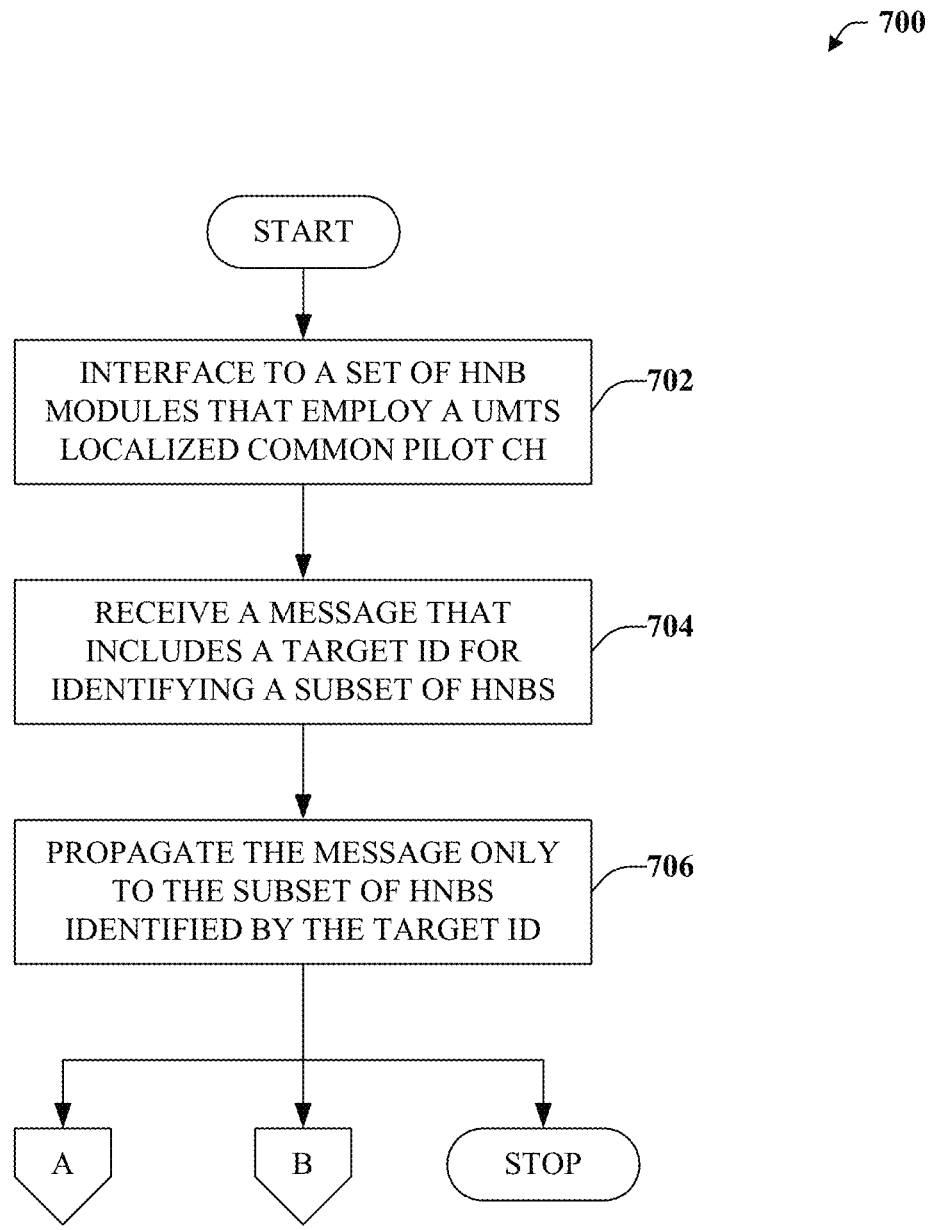
FIG. 7 is an exemplary flow chart of procedures that define a method for leveraging Universal Mobile Telecommunication System (UMTS) Terrestrial Radio Access Network (UTRAN) features for facilitating more efficient or robust communication with a femtocell network.
Figure 8:
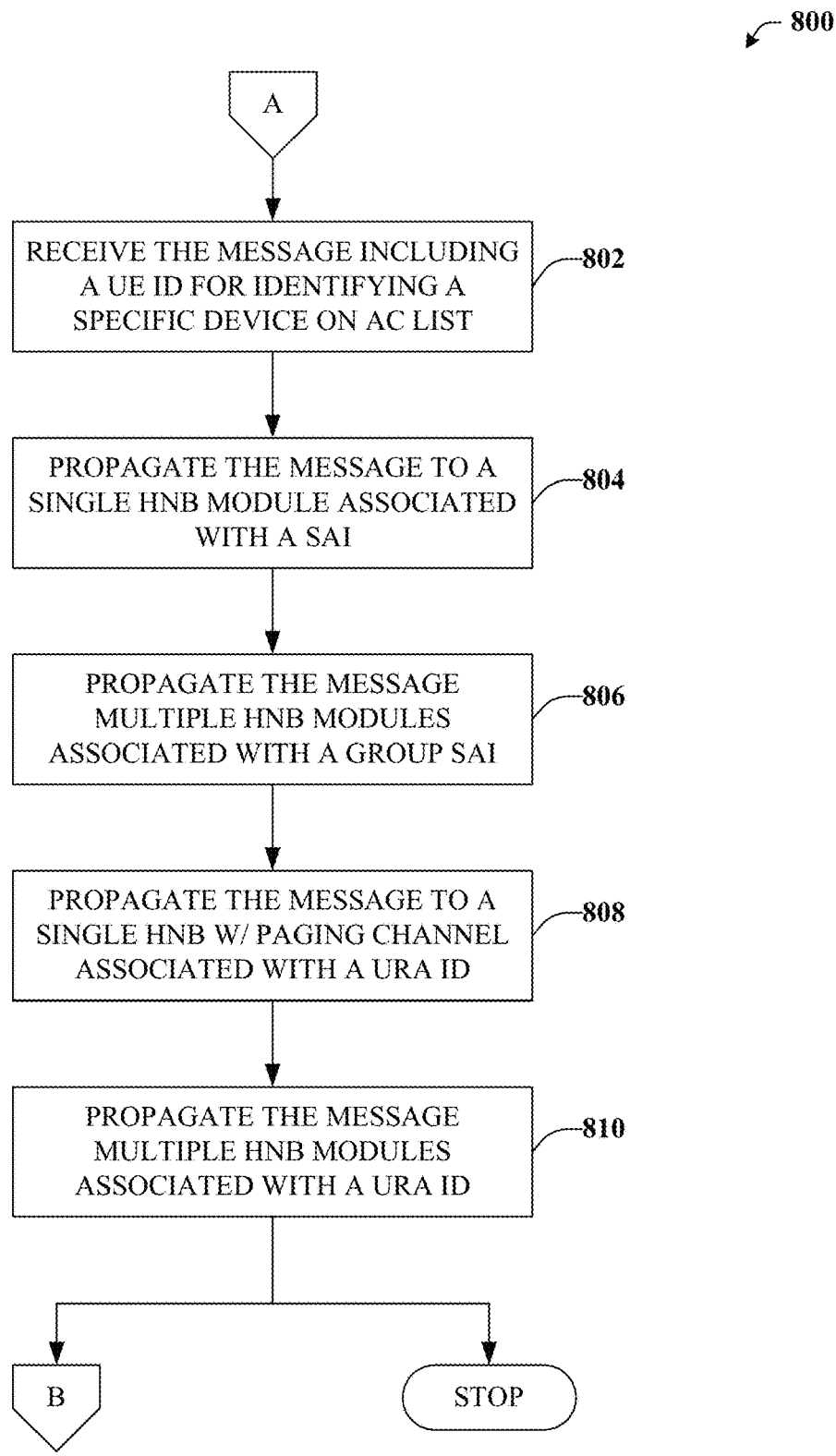
FIG. 8 is an exemplary flow chart of procedures that define a method for employing a SAI or an URA ID in connection with the target ID as well as targeting specific UE.
Figure 9:
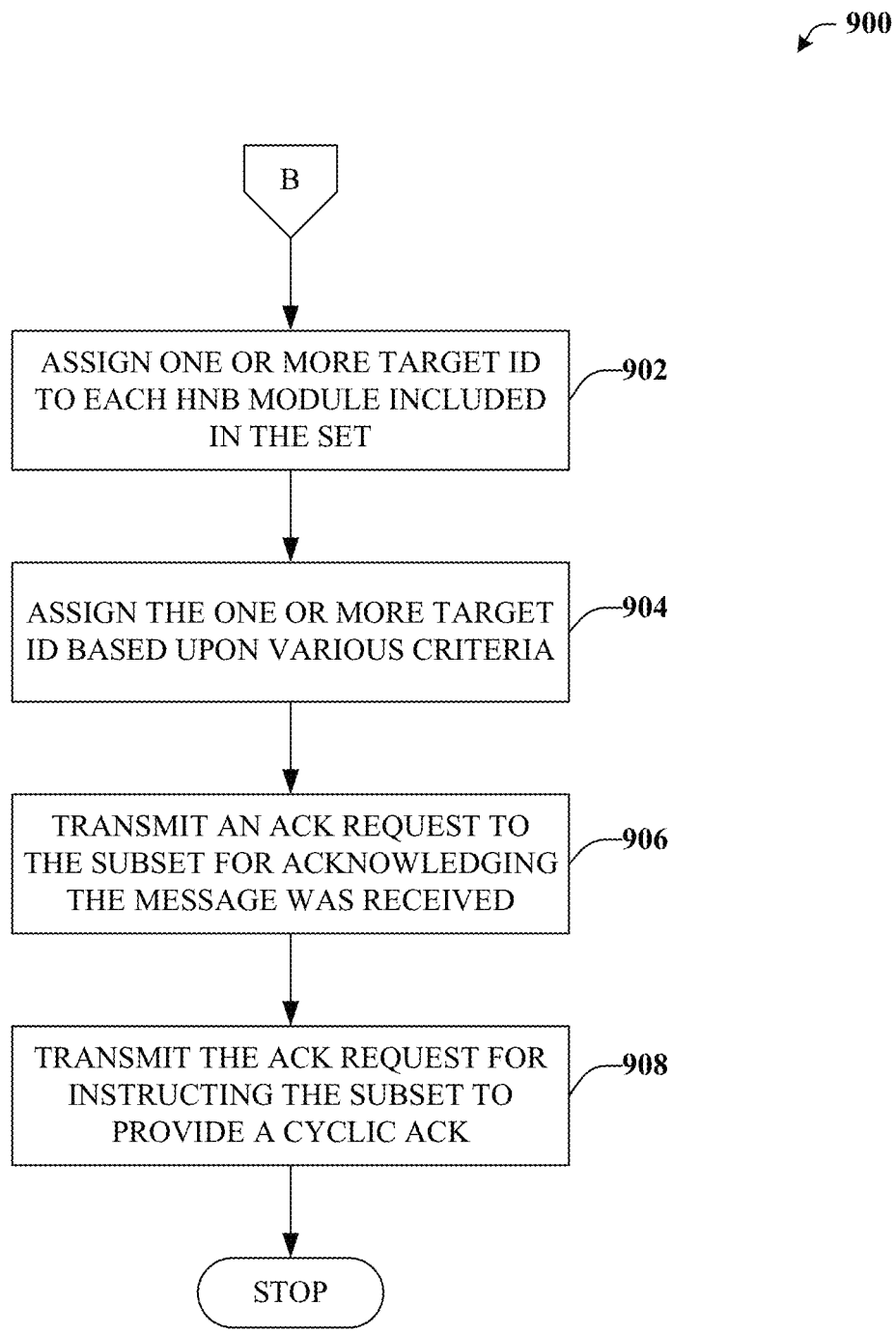
FIG. 9 depicts an exemplary flow chart of procedures defining a method for allocating target IDs to HNB modules and/or employing acknowledgements to further reduce system load.

FIGS. 7, 8, and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for leveraging Universal Mobile Telecommunication System (UMTS) Terrestrial Radio Access Network (UTRAN) features for facilitating more efficient or robust communication with a femtocell network is illustrated. Generally, at reference numeral 702, a set of home nodeB (HNB) modules that employ a UMTS localized common pilot channel can be interfaced to. The set of HNB modules can include a portion of or all HNB modules operating in a UTRAN network, any or all of which can be controlled remotely by way of an OSS or other suitable network elements.

At reference numeral 704, a message that includes a target ID can be received. The target ID can identify a subset of HNB modules included in the set of HNB modules. In other words, from among all the HNB modules interfaced to at reference numeral 702, a particular subset (e.g., one or more) can be identified by target ID. Accordingly, at reference numeral 706, the message received at reference numeral 704, in its entirety or in part, can be propagated to only the subset of HNB modules identified by the target ID, rather than to all or additional HNB modules included in the set.

Appreciably, by selectively targeting particular HNB modules, the path to which can be identified in advance by a dedicated channel, a number of advantages can be provided. For example, communications can be more efficient since flood broadcasting is no longer needed and, in fact, duplicate messages delivered to non-targeted recipients are not necessary. Moreover, selective propagation of the message can be inherently more secure as non-targeted individuals will not generally be recipients of the message at all. Furthermore, inter-system messaging and registration oscillations can also be mitigated or reduced as substantially detailed supra. Furthermore, the disclosed subject matter can be readily integrated with or supplement future technologies or regulation such as the proposals relating to Smart Grid.

With reference now FIG. 8, exemplary method 800 for employing a SAI or an URA ID in connection with the target ID as well as targeting a specific UE is provided. At reference numeral 802, the message received at reference numeral 704 of FIG. 7 can further include (e.g., in addition to the target ID) a UE ID, the UE ID identifying one or more specific wireless communication device(s) based upon an access control list provided by the serving HNB module. Hence, while the target ID can be sufficient to select a specific HNB module or femtocell, the UE ID can provide additional granularity to select a specific mobile device associated with a specific individual.

With regard to the target ID included in the message, at reference numeral 804, the message can be propagated to a single HNB module that is associated with a SAI matching the target ID. Likewise, at reference numeral 806, the message can be propagated to multiple HNB modules, each of which is associated with a group SAI matching the target ID. Thus, an SAI can be employed to define a single HNB module as detailed at reference numeral 804 as well as a collection or group of HNB modules as discussed in connection with reference numeral 806.

Additionally or alternatively, at reference numeral 808, the message can be propagated to a single HNB module with a URA paging channel enabled, wherein the single HNB module is associated with a URA ID matching the target ID. However, in the case of more than one intended recipient, at reference numeral 810, the message can be propagated to multiple HNB modules, each of which is associated with a URA ID matching the target ID. Accordingly, as with the case in which the target ID reflects a SAI, when the target ID reflects a URA ID, both individual and group HNB modules can be targeted.

Turning briefly to FIG. 9, an exemplary method 900 for allocating target IDs to HNB modules and/or employing acknowledgements to further reduce system load is depicted. At reference numeral 902, one or more target ID can be assigned to each HNB module included in the set of HNB modules. Typically, every HNB module included in the set will have at least an individual or single target ID (SID) assigned thereto, whether the single ID is based upon a SAI or an URA ID. However, some HNB modules (potentially all) can have more than one SID, e.g., one based upon a SAI and another based upon a URA ID, or for any other suitable reason. The first or primary SID can be assigned, e.g., incrementally according to a location zip code of the HNB. In addition, each HNB module can potentially have a great many group IDs (GIDs), for example, one assigned based upon a customer subscription to a local gas company, another assigned based upon a relationship with a local condominium community, and another based upon an ad hoc or temporary relationship.

Any or all of these target IDs, but particularly the GIDs can be assigned based upon a variety of useful criteria. For example, at reference numeral 904, the one or more target ID can be assigned based upon a customer relationship, a commercial relationship, a social network relationship, or another type of relationship. The one or more target ID can also be assigned based upon a subscription or a good or service provision. Other examples can include a request or query, a demographic or interest, and so on.

At reference numeral 906, an acknowledgement request can be transmitted to the subset of HNB modules for acknowledging that the message has been received. Similarly, at reference numeral 908, an acknowledgement request can be transmitted for instructing the subset of HNB devices to provide a cyclic acknowledgement in response to the acknowledgement request. The cyclic acknowledgement can be employed for mitigating inter-system reselection between a femtocell network and an associated macro network as well as for reducing inter-system message traffic between the femtocell network and the macro network.

Figure 10:
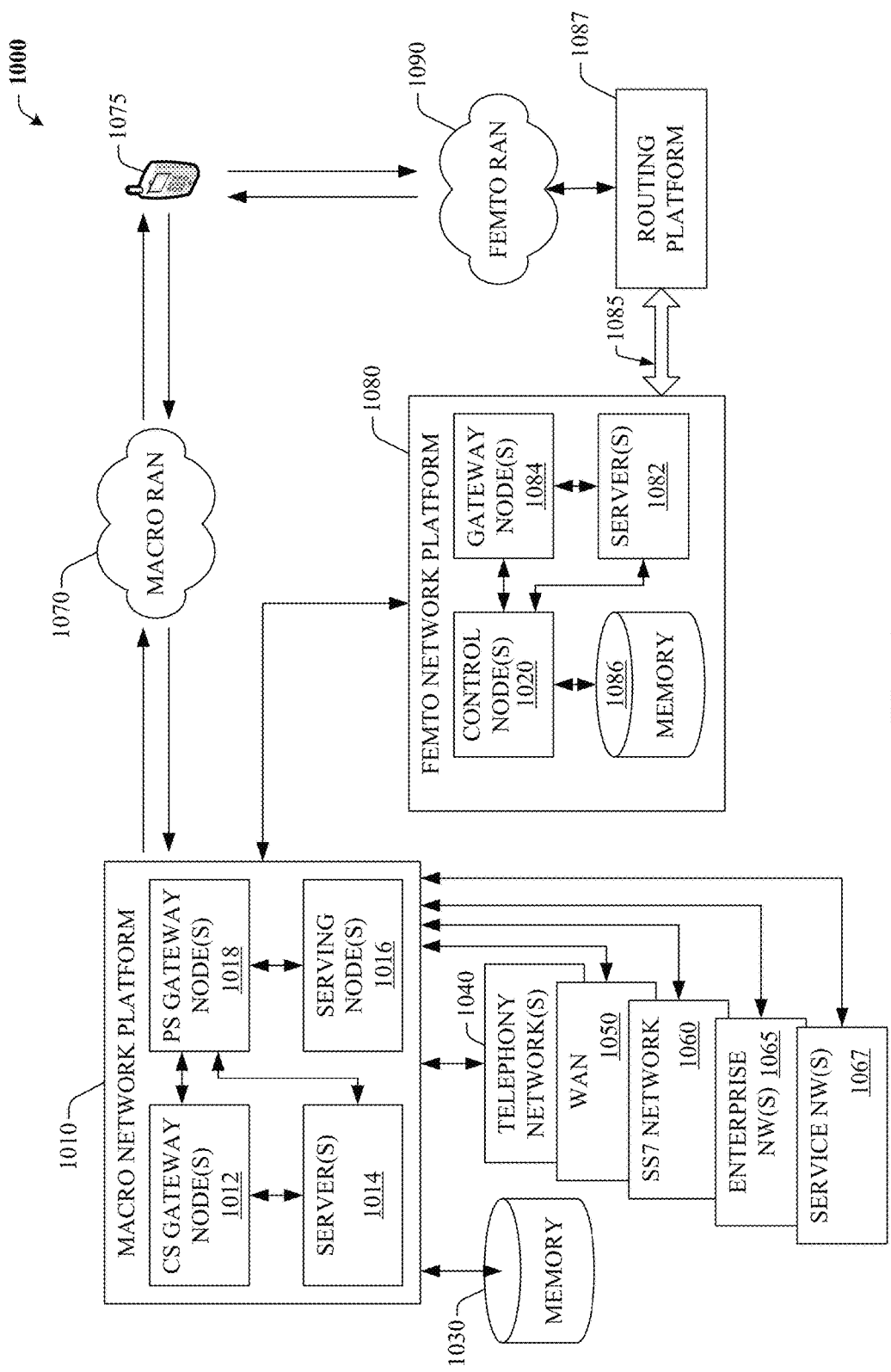
FIG. 10 illustrates an example wireless communication environment with associated components that can enable operation of a femtocell enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more fire-walls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities and can be substantially similar to the control component 320 (FIG. 3) and can include functionality thereof.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
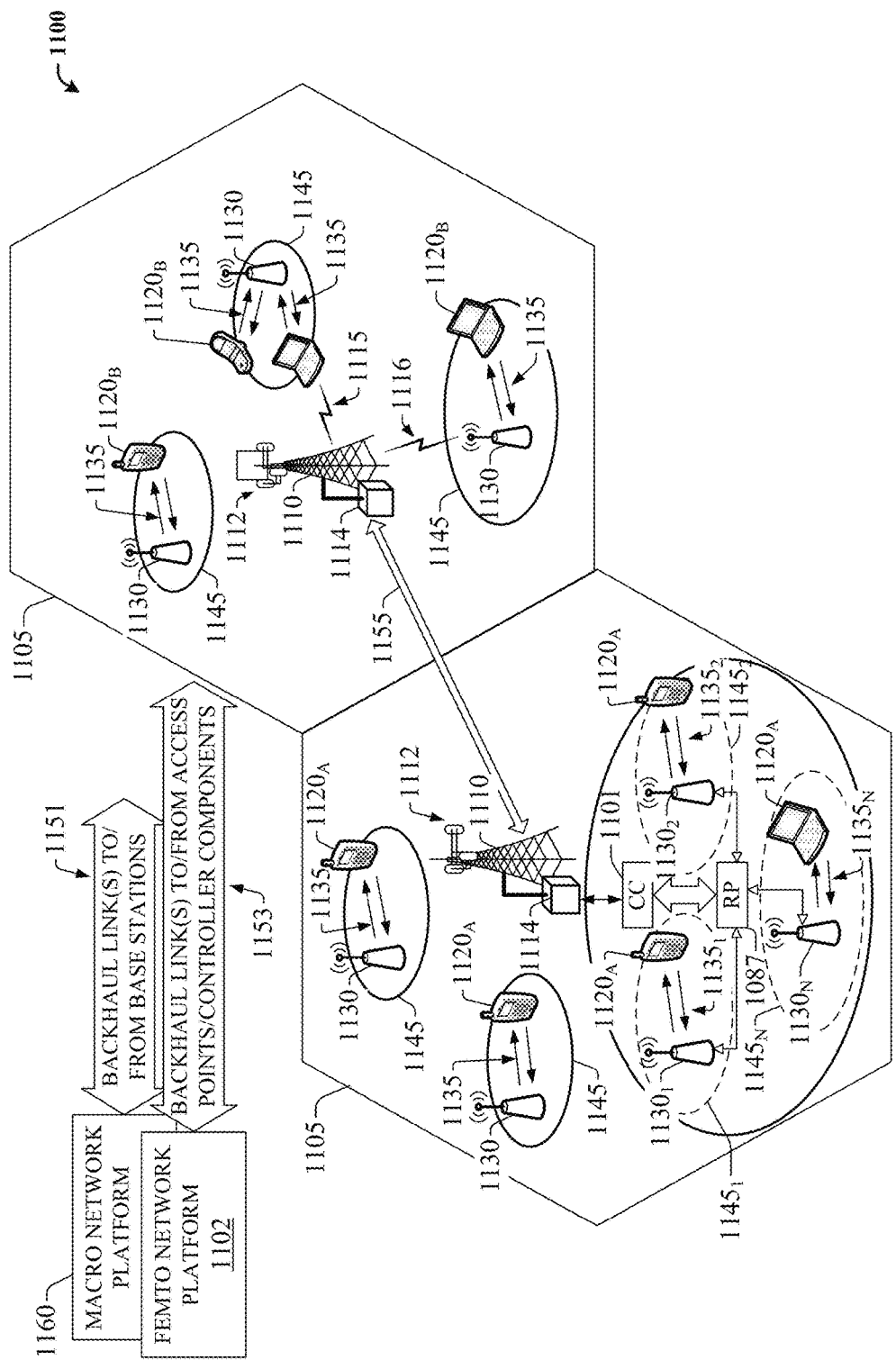
FIG. 11 illustrates a schematic deployment of a macro cell and a femto cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage, each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE 1120$_A$, 1120$_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE 1120$_A$, 1120$_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs 1120$_A$ can be routed by the RP 102, for example, internally, to another UE 1120$_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points 1130$_1$-3730$_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE 3720$_A$ connected to femto APs 1130$_1$-3830$_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   a processor; and
   a memory that stores executable instructions that, when executed by the processor, facilitate performance of operations, comprising:
      assigning target identifiers to femtocell access point devices based on characteristics of subscriber identities associated with the femtocell access point devices, wherein a femtocell access point device of the femtocell access point devices is assigned a target identifier based on the femtocell access point device being associated with a subscriber identity determined to satisfy a criterion based on the characteristics;
      receiving a first transmission comprising a message comprising the target identifier;
      identifying the femtocell access point device as a targeted recipient of the message based on the target identifier; and
      transmitting a second transmission comprising the message to the femtocell access point device.

2. The system of claim 1, wherein the criterion is based on whether a defined familial relationship is present between the subscriber identity and a group of subscriber identities associated with the target identifier.

3. The system of claim 1, wherein the criterion is based on whether the subscriber identity has a defined gender that is associated with the target identifier.

4. The system of claim 1, wherein the criterion is based on whether the subscriber identity has an income that satisfies a defined income criterion associated with the target identifier.

5. The system of claim 1, wherein the criterion is based on whether the subscriber identity has an age that satisfies a defined age criterion associated with the target identifier.

6. The system of claim 1, wherein the criterion is based on whether the subscriber identity has a political view that satisfies a defined political view associated with the target identifier.

7. The system of claim 1, wherein the criterion is based on whether the subscriber identity has a residence in a defined weather coverage area associated with the target identifier.

8. A method, comprising:
   assigning, by a system comprising a processor, target identifiers to home nodeB access point devices based on characteristics of subscriber identities associated with the home nodeB access point devices, wherein a home nodeB access point device of the home nodeB access point devices is assigned a target identifier based on the home nodeB access point device being associated with a subscriber identity determined to satisfy a specified criterion based on the characteristics;
   receiving, by the system, a first transmission comprising a message comprising the target identifier;
   identifying, by the system, the home nodeB access point device as an intended recipient of the message based on the target identifier; and sending, by the system to the home nodeB access point device, a second transmission comprising the message to the home nodeB access point device.

9. The method of claim 8, wherein the criterion is based on whether a defined familial relationship is present between the subscriber identity and a group of subscriber identities associated with the target identifier.

10. The method of claim 8, wherein the criterion is based on whether the subscriber identity has a defined gender that is associated with the target identifier.

11. The method of claim 8, wherein the criterion is based on whether the subscriber identity has an income that satisfies a defined income criterion associated with the target identifier.

12. The method of claim 8, wherein the criterion is based on whether the subscriber identity has an age that satisfies a defined age criterion associated with the target identifier.

13. The method of claim 8, wherein the criterion is based on whether the subscriber identity has a political view that satisfies a defined political view associated with the target identifier.

14. The method of claim 8, wherein the criterion is based on whether the subscriber identity has a residence that is located in a defined weather coverage area associated with the target identifier.

15. A non-transitory machine-readable medium, comprising executable instructions that, when executed by a processor, facilitate performance of operations, comprising:
assigning target identifiers for access point devices based on characteristics of subscriber identities associated with the access point devices, wherein an access point device of the access point devices is assigned a target identifier based on the access point device being determined to be associated with a subscriber identity meeting a defined criterion based on the characteristics;
receiving a first transmission of a message comprising the target identifier;
identifying the access point device as a recipient of the message based on the target identifier; and
sending a second transmission comprising the message to the access point device.

16. The non-transitory machine-readable medium of claim 15, wherein the criterion is based on whether a defined familial relationship is present between the subscriber identity and a group of subscriber identities associated with the target identifier.

17. The non-transitory machine-readable medium of claim 15, wherein the criterion is based on whether the subscriber identity has a defined gender that is associated with the target identifier.

18. The non-transitory machine-readable medium of claim 15, wherein the criterion is based on whether the subscriber identity has an income that satisfies a defined income criterion associated with the target identifier.

19. The non-transitory machine-readable medium of claim 15, wherein the criterion is based on whether the subscriber identity has an age that satisfies a defined age criterion associated with the target identifier.

20. The non-transitory machine-readable medium of claim 15, wherein the criterion is based on whether the subscriber identity has a political view that satisfies a defined political view associated with the target identifier.

* * * * *